A. H. CONSTABLE.
SEED SOWING MACHINE.
APPLICATION FILED MAY 28, 1921.

1,436,946.

Patented Nov. 28, 1922.
2 SHEETS—SHEET 1.

INVENTOR
A. H. Constable.
per Robert S. Phillips
Attorney.

Patented Nov. 28, 1922.

1,436,946

UNITED STATES PATENT OFFICE.

ARTHUR HOPE CONSTABLE, OF PENSHURST, KENT, ENGLAND.

SEED-SOWING MACHINE.

Application filed May 28, 1921. Serial No. 473,389.

*To all whom it may concern:*

Be it known that I, ARTHUR HOPE CONSTABLE, a subject of the King of Great Britain and Ireland, residing at The Quarry, Penshurst, in the county of Kent, England, have invented a new and useful Improvement in Seed-Sowing Machines, of which the following is a full and complete specification.

My invention relates to implements for sowing seed and the object of my improvement is to utilize the entire weight of the implement in consolidating the bottom of the drill or furrow in advance of the distribution of the seed thereon. A further object of the invention is to reduce the height of the implement to a minimum whereby the labour of filling the seed and manure boxes is curtailed.

Other objects of this invention will appear as the following description of the implement is read in connection with the accompanying drawings in which:—

Throughout the views similar parts are marked with like numerals of reference.

In a suitably shaped frame 1 is mounted—in suitable bearings—a transversely arranged axle 2 on which are mounted a plurality of wheels 3 which are adapted to operate both as supporting or travelling wheels and as pressing rollers. These wheels hereinafter called "roller wheels" are spaced at the desired distance from the seed drills and one or more of them—preferably the two outside ones—are coupled to said axle by any suitable form of one-way clutch so that the rolling motion of said roller wheels imparts rotary motion to said axle. The other roller wheels may be free on said shaft.

Figure 1:
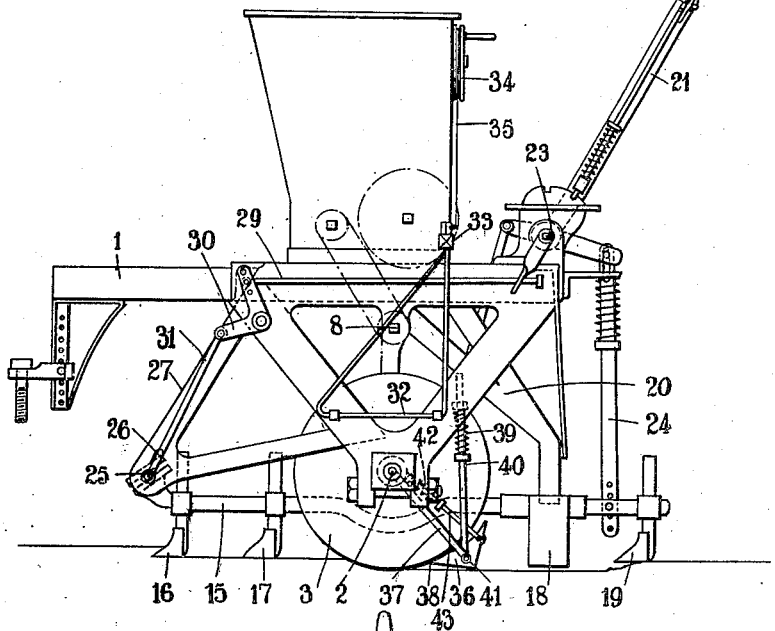
Figure 1 is a view in side elevation of the improved machine showing the tilling and sowing elements in their operative positions.
Figure 2:
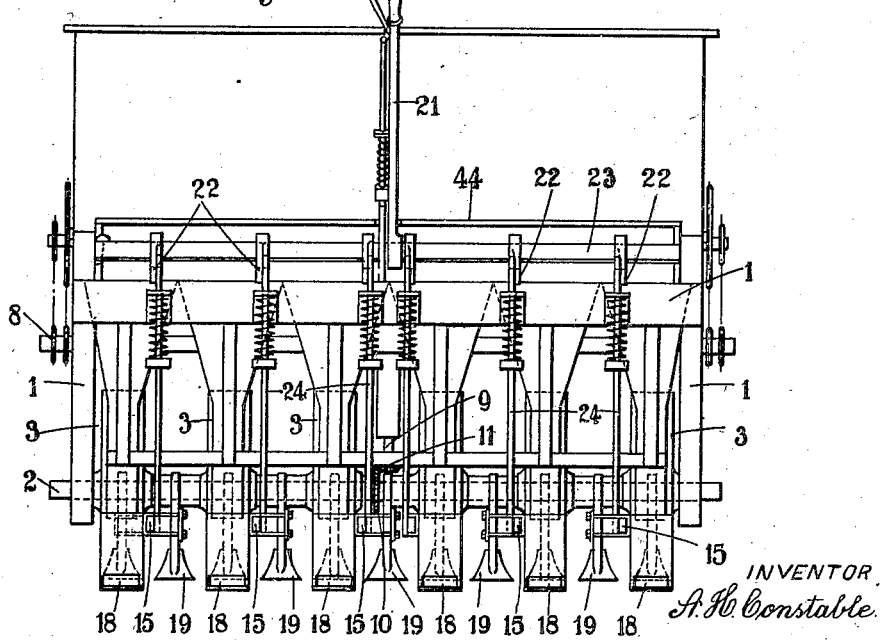
Fig. 2 is a view in rear elevation of the machine.
Figure 3:
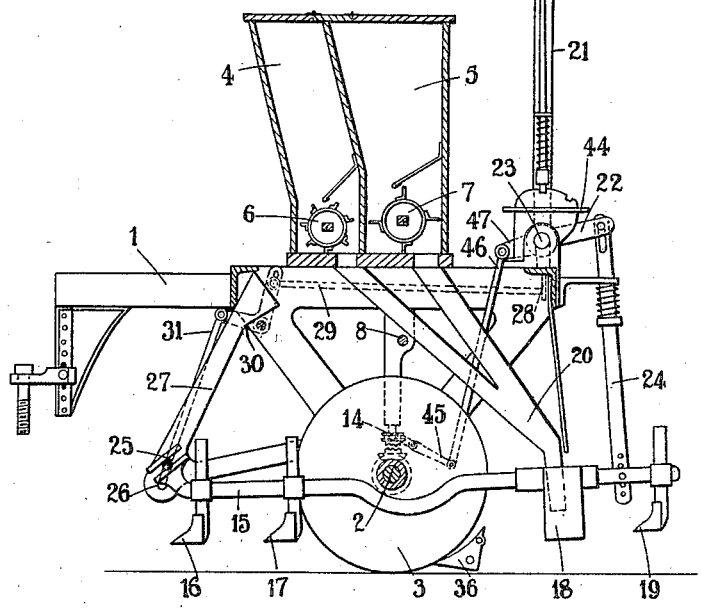
Fig. 3 is a view in elevation partly in section showing the tilling and sowing elements in their inoperative positions.
Figure 4:
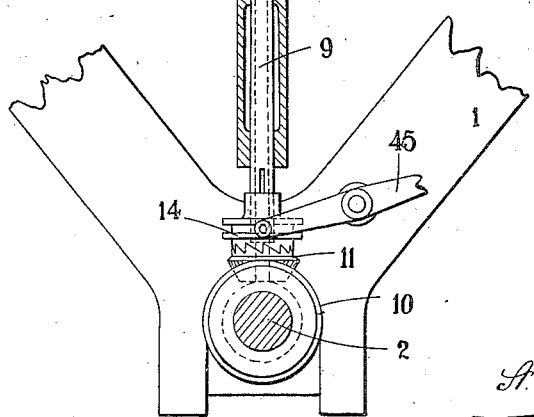
Fig. 4 is a broken view—on an enlarged scale—of the gear for driving the distributors for the seed and fertilizer and the clutch for controlling said drive.

On the top of the frame are two hoppers 4 and 5 for the seed and the pulverulent fertilizer, said hoppers being fitted with suitable rotary distributors 6 and 7 which are driven by sprocket and chain gearing from a countershaft 8. The preferred arrangement is to form each distributor in two independent sections and to drive the shafts of said sections independently by gearing arranged on each side of the implement as shown in Fig. 2.

The countershaft 8 is driven from the main axle 2 by means of a vertical shaft 9 which is in driving connection with both the main axle 2 and the countershaft 8 by suitable gearing such as bevel wheels 10 and 11 between the main axle and the vertical shaft and worm gearing 12 and 13 between said shaft and the countershaft. The bevel wheel 11 is loosely mounted on the shaft and on said shaft is a sliding clutch 14 for coupling said bevel wheel to said shaft said clutch being coupled to the hand lever 21 for raising and lowering the sub-frame carrying the tilling and sowing elements by means of a rocking lever 45 a link 46 and an arm 47 in couple with said hand lever.

Onto the main frame 1 is pivoted at the forward part of the implement the sub-frame for carrying the tilling and sowing elements which consists of a series of longitudinally arranged bars 15 each of which coacts with one of the roller wheels 3. On each of these bars are mounted hoes 16 and 17, for forming and levelling the drill or furrow, a spout 18 for distributing the seed and fertilizer and a hoe 19, for turning soil back into the drill or furrow the hoes 16 and 17 being in advance and in front of the roller wheel the spout 18 to the rear of said wheel and the hoe 19 to the rear of said spout but offset from said roller wheel. The hoes are so mounted on the bars 15 as to be adjustable both vertically and horizontally in relation thereto. The two distributors 6 and 7 are connected with the series of spouts 18 by means of suitable shoots 20.

In order to prevent the tractive effort exerted on the hoes from having a tendency to lift them out of the ground it is necessary to keep the axis of the pivot of the subframe as low as possible and not higher than the axis of the axle carrying the roller wheels. This necessitates the subframe being raised and lowered both fore and aft as the mere lifting of the rear part which causes it to turn about its forward pivot will not bring the forward hoes clear of the ground without giving excessive and unnecessary lift to the rear part of the subframe. A convenient lifting and lowering gear comprises a hand lever 21 which is coupled to the rear of the sub-frame by a rocking arm 22 mounted on the shaft 23 which forms the pivot of the lever 21 and a coupling link 24 which is preferably provided with a spring cushioning device to enable the sub-frame to give way in case any of the hoes meets with an obstruction. The front of the subframe is is pivoted to the main frame by a pivotal shaft 25 which in order to allow of said front part of said subframe being raised or lowered said pivotal shaft is arranged to work in slots 26 in the side members 27 of the frame so that it can be lifted at the same time that the rear part of the sub-frame is lifted. To effect this the hand lever 21 is coupled to said pivotal shaft 25 by means of an arm 28 on the shaft 23 carrying said hand lever, a coupling bar 29, a bell-crank lever 30 and a coupling link 31. In order that the lifting action be not applied to the front part of the sub-frame until the rear part thereof has commenced to lift, the bar 29 has a predetermined amount of free movement relative to the arm 28.

As in some soils and under certain atmospheric conditions the roller wheels may have a tendency to pick up the soil a scraper 36 is mounted at the rear of each of said wheels. These scrapers are carried by arms 37 pivoted at or about the axis of the roller wheels and are so arranged that the operating edge 38 contacts the roller wheel as near to the ground as possible so that any soil picked up is returned to the bed of the drill at once. The necessary pressure is imparted to the scraper to keep its operative edge in engagement with the wheel by means of a spring 39 operating through a link 40. The scraper is so shaped that its heel part 41 may be utilized for pressing back the picked up soil into the bed of the seed drill, the required pressure being obtained by a spring 42 operating through a link 43.

By the use of relatively small roller wheels the height of the machine can be kept low which not only facilitates the loading of the hoppers but enables the top of said hoppers to be utilized as a seat for the attendant, in which position he is able to watch that the machine is functioning properly and to control the action of the distributors through the hand lever 21. A foot platform 44 carried by the brackets of the bearings of the shaft 23 may be provided.

What I claim is:—

1. A seed sowing implement comprising a plurality of roller wheels mounted on a common axle carried by bearings mounted on a frame, a sub-frame consisting of a plurality of longitudinally arranged bars pivoted to the main frame to move about a common axis in advance of the roller wheels, a plurality of hoes mounted on each of said bars in advance of the roller wheels, a seed spout mounted on each of said bars in the rear of the roller wheels, a hoe mounted on each of said bars in the rear of the seed spout, and means for raising and lowering the sub-frame both fore and aft.

2. A seed sowing implement comprising a plurality of roller wheels mounted on a common axle carried by bearings mounted on a frame and adapted to operate both as carrying wheels and pressure rollers, a sub-frame consisting of a plurality of longitudinally arranged bars pivoted to the main frame to move about a common axis in advance of the roller wheels, a plurality of hoes mounted on each of said bars in advance of the roller wheels, a seed spout mounted on each of said bars in the rear of the roller wheels, a hoe mounted on each of said bars in the rear of the seed spout, and means for raising and lowering the sub-frame fore and aft by a common action.

3. A seed sowing implement comprising a plurality of relatively small wheels mounted on a common axle carried by bearings mounted on a frame and adapted to operate both as supporting wheels and as pressure rollers, a sub-frame consisting of a plurality of longitudinally arranged bars pivoted to the main frame to move about a common axis in advance of the roller wheels, a plurality of hoes mounted on each of said bars in advance of the roller wheels, a seed spout mounted on each of said bars in the rear of the roller wheels, a hoe mounted on each of said bars in the rear of the seed spout, and means for raising and lowering the bars forming the sub-frame both fore and aft while permitting each to have a predetermined amount of vertical movement to enable it to accommodate itself to the contour of the ground.

4. A seed sowing implement comprising a plurality of roller wheels mounted on a common axle carried by bearings mounted on a frame, a sub-frame consisting of a plurality of longitudinally arranged bars pivoted to the main frame to move about a common axis in advance of the roller wheels, a plurality of hoes mounted on each of said bars in advance of the roller wheels, a seed spout mounted on each of said bars in the rear of the roller wheels, a hoe mounted on each of said bars in the rear of the seed spout, and means for raising and lowering the sub-frame both fore and aft the rear part being lifted in advance of the front part.

5. A seed sowing implement comprising a plurality of roller wheels mounted on a common axle carried by bearings mounted on a frame, a sub-frame consisting of a plurality of longitudinally arranged bars, pivoted to the main frame to move about a common axis in advance of the roller wheels, a plurality of hoes mounted on each of said bars in advance of the roller wheels, a seed spout mounted on each of said bars in the rear of the roller wheels, a hoe mounted on each of said bars in the rear of the seed spout, means for raising and lowering the sub-frame both fore and aft and a scraper co-acting with each roller wheel to remove the soil picked up by the wheel and return same into the trench or furrow.

6. A seed sowing implement comprising a plurality of relatively small wheels mounted on a comomn axle carried by bearings mounted on a frame and adapted to operate both as travelling wheels and as pressure rollers to consolidate the seed bed in advance of the sowing of the seed, a sub-frame consisting of a plurality of longitudinally arranged bars pivoted to the main frame to move about a common axis in advance of the roller wheels, a plurality of hose mounted on each of said bars in advance of the roller wheels, a seed spout mounted on each of said bars in the rear of the roller wheels, a hoe mounted on each of said bars in the rear of the seed spout, means for raising and lowering the sub-frame both fore and aft the rear part being lifted in advance of the front part, and a scraper co-acting with each roller wheel to remove the soil picked up by the wheel and return same into the trench or furrow.

ARTHUR HOPE CONSTABLE.